(12) United States Patent
Gutelius

(10) Patent No.: US 9,587,692 B2
(45) Date of Patent: Mar. 7, 2017

(54) DIFFERENTIAL FOR A PARKING BRAKE ASSEMBLY

(71) Applicant: AKEBONO BRAKE INDUSTRY CO., LTD, Chuo-ku, Tokyo (JP)

(72) Inventor: Kenneth Eric Gutelius, Lake Orion, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 14/676,346

(22) Filed: Apr. 1, 2015

(65) Prior Publication Data
US 2016/0290424 A1 Oct. 6, 2016

(51) Int. Cl.
*F16D 65/18* (2006.01)
*F16D 121/24* (2012.01)
(Continued)

(52) U.S. Cl.
CPC .......... *F16D 65/18* (2013.01); *F16D 2121/24* (2013.01); *F16D 2125/48* (2013.01); *F16D 2125/52* (2013.01)

(58) Field of Classification Search
CPC .... B60T 13/746; H02K 7/1004; H02K 7/003; H02K 7/116; F16D 65/0006; F16D 65/18; F16D 65/0068; F16D 65/14; F16D 2055/0016; F16D 2055/0091; F16D 2121/02; F16D 2121/24; F16D 2125/46; F16D 2125/50; F16D 2125/52;
(Continued)

(56) References Cited

U.S. PATENT DOCUMENTS 1,282,614 A 10/1918 Miller
1,361,895 A 12/1920 Nogrady
(Continued)

FOREIGN PATENT DOCUMENTS

CN 101384836 B 3/2009
CN 101568752 B 10/2009
(Continued)

OTHER PUBLICATIONS

Co-Pending U.S. Appl. No. 14/567,617, filed Dec. 11, 2014.

*Primary Examiner* — Robert A Siconolfi
*Assistant Examiner* — San Aung
(74) *Attorney, Agent, or Firm* — The Dobrusin law Firm, P.C.

(57) ABSTRACT

The present teachings relate to a brake assembly, and more particularly to a differential for a brake assembly that is unlocked or open in one configuration and locked or closed in another configuration. The brake assembly comprises a differential and one or more output shafts. During rotation of at least one of the one or more output shafts a brake apply is created or released. During creation of the brake apply, the differential distributes a rotational force to each of the one or more output shafts until at least one of the one or more output shafts experiences higher resistance and then the differential re-distributes the rotational force to at least one of the one or more output shafts with lower resistance. During release of the brake apply, the differential distributes an opposing rotational force equally to each of the one or more output shafts.

20 Claims, 6 Drawing Sheets

(51) Int. Cl.
*F16D 125/48* (2012.01)
*F16D 125/52* (2012.01)

(58) Field of Classification Search
CPC ............ F16D 2125/24; F16D 2125/40; F16D 2123/00; F16D 57/002; F16H 48/08
USPC ....................................................... 188/162
See application file for complete search history.

(56) References Cited

U.S. PATENT DOCUMENTS

| | | |
|---|---|---|
| 1,399,093 A | 12/1921 | Vincent |
| 1,430,744 A | 10/1922 | Lewis |
| 1,529,804 A | 3/1925 | Norgrady |
| 1,556,101 A | 10/1925 | Goodhart |
| 1,586,861 A | 6/1926 | Taylor |
| 1,777,024 A | 9/1930 | Wildhaber |
| 1,791,198 A | 2/1931 | Focher |
| 1,938,649 A | 12/1933 | Welsh |
| 2,231,968 A | 2/1941 | Thornton |
| 2,239,058 A | 9/1943 | Knoblock |
| 2,329,059 A | 9/1943 | Knoblock |
| 2,329,075 A | 9/1943 | Myers |
| 2,354,214 A | 7/1944 | Lutz |
| 2,420,294 A | 5/1947 | Beckwith |
| 2,424,942 A | 7/1947 | Mynssen |
| 2,431,272 A | 11/1947 | Mynssen |
| 2,479,638 A | 8/1949 | Randall |
| 2,481,873 A | 9/1949 | Randall |
| 2,501,956 A | 3/1950 | Misener |
| 2,545,601 A | 3/1951 | Brubaker |
| 2,557,937 A | 6/1951 | Buckendal |
| 2,570,191 A | 10/1951 | Beckwith |
| 2,624,216 A | 1/1953 | Nielsen |
| 2,638,794 A | 5/1953 | Knoblock |
| 2,667,087 A | 1/1954 | Myers |
| 2,667,088 A | 1/1954 | Myers |
| 2,720,796 A | 10/1955 | Schou |
| 2,778,246 A | 1/1957 | Thornton |
| 2,830,466 A | 4/1958 | Myers |
| 2,850,922 A | 9/1958 | Welsh |
| 2,855,806 A | 10/1958 | Fallon |
| 2,885,032 A | 5/1959 | Dombeck |
| 2,923,174 A | 2/1960 | Gleasman |
| 2,945,400 A | 7/1960 | Dupras |
| 2,971,404 A | 2/1961 | Thorton |
| 3,008,350 A | 11/1961 | Misener |
| 3,027,781 A | 4/1962 | O'Brien |
| 3,053,114 A | 9/1962 | Singer |
| 3,131,578 A | 5/1964 | Elliott |
| 3,142,203 A | 7/1964 | Bamford |
| 3,145,583 A | 8/1964 | Frentzel |
| 3,186,258 A | 6/1965 | Meldola |
| 3,258,993 A | 7/1966 | Dupras |
| 3,330,169 A | 7/1967 | Carrico |
| 3,335,623 A | 8/1967 | Roach |
| 3,343,429 A | 9/1967 | Frost |
| 3,344,688 A | 10/1967 | Frost |
| 3,357,272 A | 12/1967 | Roberts |
| 3,362,258 A | 1/1968 | Thornton |
| 3,364,791 A | 1/1968 | Truckle |
| 3,396,609 A | 8/1968 | Stockton |
| 3,397,593 A | 8/1968 | Knoblock |
| 3,403,582 A | 10/1968 | Morgen |
| 3,453,905 A | 7/1969 | Schmid |
| 3,474,689 A | 10/1969 | Young |
| 3,528,323 A | 9/1970 | Kamlukin |
| 3,546,968 A | 12/1970 | Altmann |
| 3,572,165 A | 3/1971 | Roper |
| 3,606,803 A | 9/1971 | Ottemann |
| 3,628,399 A | 12/1971 | Seitz |
| 3,651,713 A | 3/1972 | Mueller |
| 3,651,907 A | 3/1972 | Myer, Sr. |
| 3,791,237 A | 2/1974 | Kitano et al. |
| 3,791,238 A | 2/1974 | Bokovoy |
| RE28,004 E | 5/1974 | Ottemann |
| 3,809,191 A | 5/1974 | Woodward |
| 3,815,442 A | 6/1974 | McAninch |
| 3,818,781 A | 6/1974 | Goscenski, Jr. |
| 3,831,462 A | 8/1974 | Baremor |
| 3,837,236 A | 9/1974 | Kagata |
| 3,845,672 A | 11/1974 | Goscenski, Jr. |
| 3,864,992 A | 2/1975 | Lovdahl |
| 3,911,792 A | 10/1975 | Heyl et al. |
| 3,915,032 A | 10/1975 | Ottermann |
| 3,916,728 A | 11/1975 | Behar et al. |
| 3,938,408 A | 2/1976 | Baremor |
| 3,958,464 A | 5/1976 | Kronbergs |
| 3,985,045 A | 10/1976 | Shilling et al. |
| 4,037,698 A | 7/1977 | Rix et al. |
| 4,077,279 A | 3/1978 | Goscenski, Jr. |
| 4,104,931 A | 8/1978 | Tomich |
| 4,159,656 A | 7/1979 | Tomich |
| 4,162,637 A | 7/1979 | Altmann |
| 4,169,394 A | 10/1979 | Estrada |
| 4,249,429 A | 2/1981 | Denning |
| 4,265,143 A | 5/1981 | Goscenski, Jr. et al. |
| 4,269,086 A | 5/1981 | Altmann |
| 4,271,722 A | 6/1981 | Campbell |
| 4,389,909 A | 6/1983 | Goscenski, Jr. |
| 4,400,996 A | 8/1983 | Schou |
| 4,424,725 A | 1/1984 | Bawks |
| 4,462,272 A | 7/1984 | Roper |
| 4,491,035 A | 1/1985 | Gleasman et al. |
| 4,491,036 A | 1/1985 | Stritzel |
| 4,524,640 A | 6/1985 | Neumann et al. |
| 4,526,063 A | 7/1985 | Oster |
| 4,535,651 A | 8/1985 | Chambers |
| 4,555,962 A | 12/1985 | Bucarelli |
| 4,557,158 A | 12/1985 | Dissett et al. |
| 4,569,250 A | 2/1986 | Nellums |
| 4,598,609 A | 7/1986 | Nellums et al. |
| 4,621,540 A | 11/1986 | Davison |
| 4,644,818 A | 2/1987 | Choma et al. |
| 4,703,671 A | 11/1987 | Jikihara |
| 4,745,818 A | 5/1988 | Edwards et al. |
| 4,792,010 A | 12/1988 | Kitao et al. |
| 4,815,337 A | 3/1989 | Peloquin |
| 4,815,338 A | 3/1989 | Holan et al. |
| 4,838,118 A | 6/1989 | Binkley |
| 4,977,796 A | 12/1990 | Littke |
| 5,007,886 A | 4/1991 | Holmquist et al. |
| 5,037,362 A | 8/1991 | Teraoka et al. |
| 5,090,949 A | 2/1992 | Thoma et al. |
| 5,098,356 A | 3/1992 | Guidoni et al. |
| 5,142,940 A | 9/1992 | Hasegawa |
| 5,183,446 A | 2/1993 | Hughes |
| 5,226,861 A | 7/1993 | Engle |
| 5,413,015 A | 5/1995 | Zentmyer |
| 5,524,509 A | 6/1996 | Dissett |
| 5,533,424 A | 7/1996 | Mimura |
| 5,562,561 A | 10/1996 | Gillard |
| 5,590,572 A | 1/1997 | Valente |
| 5,603,246 A | 2/1997 | Zentmyer |
| 5,637,049 A | 6/1997 | Zentmyer et al. |
| 5,671,640 A | 9/1997 | Valente |
| 5,759,126 A | 6/1998 | Zentmyer et al. |
| 5,759,129 A | 6/1998 | Zentmyer et al. |
| 5,769,189 A | 6/1998 | Heibel et al. |
| 5,785,157 A | 7/1998 | Scott et al. |
| 5,816,971 A | 10/1998 | Zentmyer et al. |
| 5,836,220 A | 11/1998 | Valente |
| 5,857,936 A | 1/1999 | Ishikawa |
| 5,897,453 A | 4/1999 | Mimura |
| 5,901,618 A | 5/1999 | Tyson et al. |
| 5,913,390 A | 6/1999 | Hostetler |
| 5,951,426 A | 9/1999 | Forrest |
| 5,983,754 A | 11/1999 | Tyson et al. |
| 5,989,147 A | 11/1999 | Forrest et al. |
| 6,001,040 A | 12/1999 | Engle |
| 6,019,694 A | 2/2000 | Forrest et al. |
| 6,047,615 A | 4/2000 | Tyson et al. |
| 6,053,073 A | 4/2000 | Tyson et al. |
| 6,053,074 A | 4/2000 | Tyson et al. |

(56) References Cited

U.S. PATENT DOCUMENTS

| | | |
|---|---|---|
| 6,062,105 A | 5/2000 | Tyson et al. |
| 6,076,644 A | 6/2000 | Forrest et al. |
| 6,092,439 A | 7/2000 | Tyson et al. |
| 6,105,465 A | 8/2000 | Tyson et al. |
| 6,257,090 B1 | 7/2001 | Arakawa et al. |
| 6,261,202 B1 | 7/2001 | Forrest et al. |
| 6,319,166 B1 | 11/2001 | Kyle et al. |
| 6,432,020 B1 | 8/2002 | Rivera et al. |
| 6,446,768 B2 | 9/2002 | Kikuta et al. |
| 6,470,988 B1 | 10/2002 | Beesley |
| 6,491,126 B1 | 12/2002 | Robison et al. |
| 6,540,640 B2 | 4/2003 | Hibbler et al. |
| 6,551,209 B2 | 4/2003 | Cheadle et al. |
| 6,676,555 B2 | 1/2004 | Duan |
| 6,684,988 B2 | 2/2004 | Kapaan et al. |
| 6,796,412 B2 | 9/2004 | Teraoka |
| 6,935,982 B2 | 8/2005 | Handa et al. |
| 7,018,317 B2 | 3/2006 | Tweet et al. |
| 7,022,041 B2 | 4/2006 | Valente |
| 7,086,984 B1 | 8/2006 | Lagenfeld |
| 7,147,585 B2 | 12/2006 | Valente |
| 7,160,219 B2 | 1/2007 | Oates |
| 7,192,376 B2 | 3/2007 | Ishii et al. |
| 7,219,772 B2 | 5/2007 | Bieker et al. |
| 7,232,399 B2 | 6/2007 | Valente |
| 7,361,116 B2 | 4/2008 | Kyle et al. |
| 7,484,365 B2 | 2/2009 | Ishii et al. |
| 7,611,437 B2 | 11/2009 | Valente |
| 7,654,934 B2 | 2/2010 | Alfredson |
| 7,722,495 B1 | 5/2010 | Stanley |
| 7,779,968 B2 * | 8/2010 | Noh .............. B60T 7/107 188/156 |
| 7,824,296 B2 | 11/2010 | Lyman |
| 7,837,588 B2 | 11/2010 | Valente |
| 7,946,946 B2 | 5/2011 | Schmidt |
| 7,951,037 B2 | 5/2011 | Sudorowski et al. |
| 7,988,584 B2 | 8/2011 | Balenda, II et al. |
| 8,117,946 B2 | 2/2012 | Haugeberg |
| 8,146,458 B2 | 4/2012 | Radzevich |
| 8,167,763 B2 | 5/2012 | Curtis |
| 8,181,750 B2 | 5/2012 | Homma et al. |
| 8,231,493 B2 | 7/2012 | Radzevich |
| 8,292,080 B2 | 10/2012 | Urquhart et al. |
| 8,485,065 B2 | 7/2013 | Blanchard |
| 9,145,939 B2 * | 9/2015 | Giering .............. F16D 65/0006 |
| 9,145,950 B2 | 9/2015 | Dettenberger et al. |
| 9,180,844 B2 | 11/2015 | Murata et al. |
| 9,188,182 B2 | 11/2015 | Park et al. |
| 9,297,433 B2 | 3/2016 | Takewaki et al. |
| 9,316,277 B2 | 4/2016 | Winkler et al. |
| 9,333,953 B2 | 5/2016 | Masuda et al. |
| 2004/0045776 A1 | 3/2004 | Baumgartner et al. |
| 2004/0178028 A1 * | 9/2004 | Farmer .............. B60T 13/741 188/162 |
| 2010/0096224 A1 * | 4/2010 | Kim .............. F16D 51/48 188/74 |
| 2010/0122877 A1 * | 5/2010 | Kim .............. F16D 65/18 188/72.8 |
| 2010/0307289 A1 | 12/2010 | Blanchard |
| 2012/0252625 A1 | 10/2012 | Crasset |
| 2013/0087422 A1 | 4/2013 | Park et al. |
| 2013/0237363 A1 | 9/2013 | Fusegi et al. |
| 2015/0129371 A1 | 5/2015 | Gutelius et al. |
| 2015/0354650 A1 | 12/2015 | Bull |
| 2015/0362031 A1 | 12/2015 | Kong et al. |
| 2016/0017942 A1 | 1/2016 | Kwon et al. |
| 2016/0076607 A1 | 3/2016 | Yasui et al. |
| 2016/0076631 A1 | 3/2016 | Funada |

FOREIGN PATENT DOCUMENTS

| | | |
|---|---|---|
| EP | 1475264 A2 | 11/2004 |
| EP | 2878849 A2 | 3/2015 |
| EP | 2718583 B1 | 3/2016 |
| JP | 2009052682 A | 3/2009 |
| WO | 2015/151052 A1 | 10/2015 |

* cited by examiner

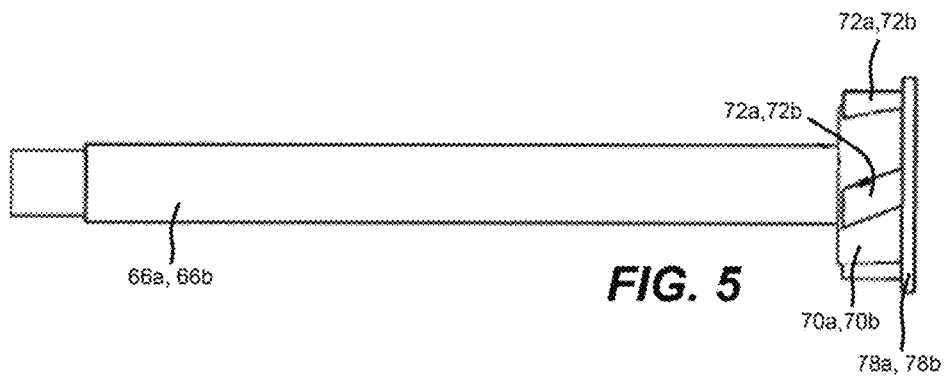
FIG. 5
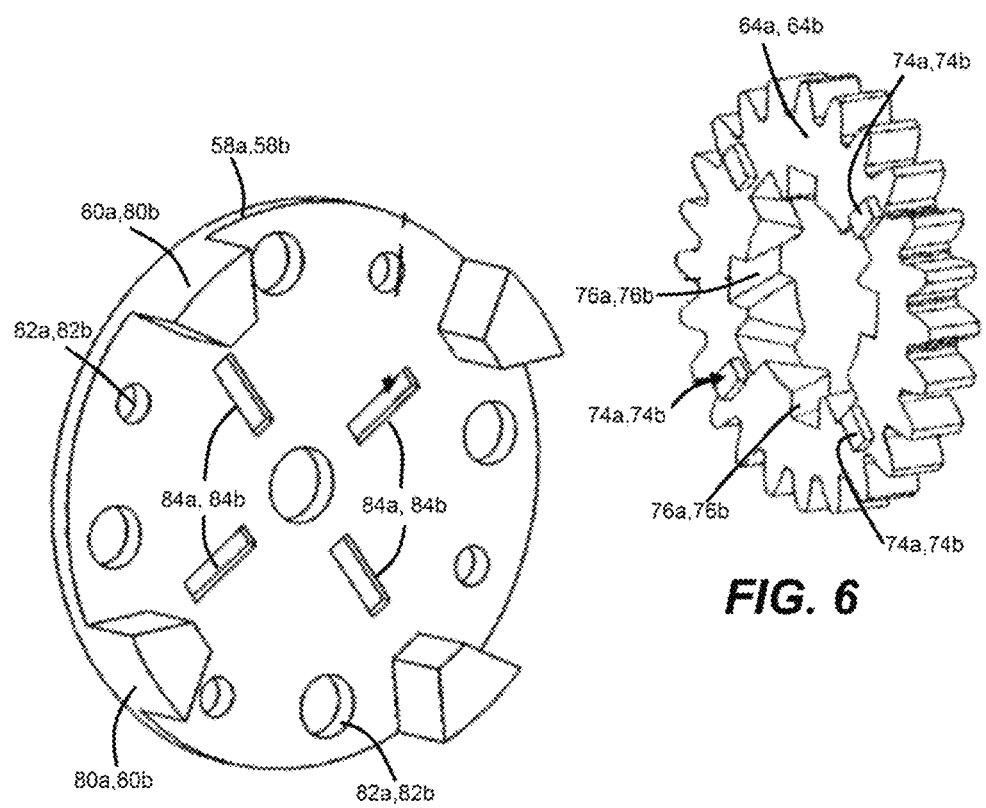
FIG. 6
FIG. 7

DIFFERENTIAL FOR A PARKING BRAKE ASSEMBLY

FIELD

The present teachings relate to a parking brake assembly and more particularly to a differential for a parking brake assembly that can be unlocked in one configuration and locked in another configuration.

BACKGROUND

The present teachings are predicated upon providing an improved parking brake assembly. For example, the parking brake assembly may be used with almost any brake assembly and/or almost any vehicle (e.g. car, truck, bus, train, airplane, or the like). Alternatively, the parking brake assembly can be integrated into one or more manufacturing assemblies requiring a brake, such as a lathe, a winder for paper products or cloth, amusement park rides, wind turbines, or the like. However, the present teachings are most suitable for use with a disc brake system or a drum brake system for a passenger vehicle (e.g., a car, truck, sports utility vehicle, or the like).

Generally, a brake assembly (e.g., a disc brake system) may include a primary brake assembly and a parking brake assembly. The primary brake assembly includes a rotor, a brake caliper, and inboard and outboard brake pads on opposing sides of a rotor. The brake caliper also includes one or more piston bores, each of which house a piston that moves along a piston axis during a brake apply and release of the brake apply. To create a brake apply, brake fluid can move the one or more pistons into contact with the inboard brake pad and then move the inboard brake pad into contact with one side of the rotor, while an opposing brake pad is moved into contact with the opposing side of the rotor. Another example of a primary brake assembly is a drum brake assembly that includes a pair of brake shoes in a drum. The brake shoes are moved into contact with an inner surface of the drum to create a brake apply.

When a vehicle is stopped or parked, the parking brake assembly may be used to prevent movement of the vehicle. The parking brake assembly may be a discrete assembly, or may utilize one or more components of the primary brake assembly. That is, the parking brake assembly may use the one or more of the pistons and the one or more brake pads of the primary brake assembly to create the brake apply. For example, the parking brake assembly may move the one or more pistons, which may move the one or more brake pads into contact with the rotor to create and maintain a brake apply.

Examples of various brake assemblies and parking brake assemblies are disclosed in U.S. Pat. Nos. 2,885,032; 3,809,191; 5,785,157; 5,913,390; 6,446,768; 6,684,988; 8,2920,080; in U.S. Patent Application Publication No. 2013/0087422; and in U.S. patent application Ser. No. 14/567,617 filed on Dec. 11, 2014, all of which are expressly incorporated herein by reference for all purposes. It would be attractive to have a parking brake assembly that can be used with any brake assembly, including a disc brake system. It would be desirable to have a parking brake assembly including a differential that can be unlocked in one configuration to create a brake apply and locked in another configuration to release a brake apply. During a brake apply, it would be attractive to have a differential that can distribute a rotational force to the output shafts until one of the output shafts experiences higher resistance, which then the differential can re-distribute the rotational force to the other output shaft. During release of the brake apply, it would be attractive to have a differential that can distribute an opposing rotational force equally the output shafts.

SUMMARY

The present teachings provide a parking brake assembly that can be used with any brake system, including a disc brake system. The present teachings provide a parking brake assembly including a differential that is unlocked in one configuration to create a brake apply and locked in another configuration to release the brake apply. The present teachings also provide a differential that, during a brake apply, distributes a rotational force to the output shafts until one of the output shafts experiences higher resistance and then re-distributes the rotational force to the other output shaft. During release of the brake apply, the differential of the present teachings distributes an opposing rotational force equally the output shafts.

The present teachings also provide a brake assembly comprising a differential and one or more output shafts. During rotation of at least one of the one or more output shafts, a brake apply is created or released. During creation of the brake apply, the differential distributes a rotational force to each of the one or more output shafts until at least one of the one or more output shafts experiences higher resistance; the differential then re-distributes the rotational force to at least one of the one or more output shafts with lower resistance. During release of the brake apply, the differential distributes an opposing rotational force equally to each of the one or more output shafts.

The present teachings further provide a brake assembly including a parking brake assembly. The parking brake assembly includes a differential including, two moveable output gears in selective engagement with the pair of carriers, and two output shafts in communication with the differential. Each of the two opposing carriers include one or more notches. A motor supplies a rotational unlocking force to the differential to unlock the differential during creation of a brake apply and supplies a rotational locking force to the differential to lock the differential during release of the brake apply. During creation of the brake apply, the differential distributes the rotational unlocking force to each of the output shafts until one of output shafts experiences higher resistance and then re-distributes the rotational unlocking force to the other output shaft. During release of the brake apply, the differential distributes the rotational locking force equally to each of the output shafts.

BRIEF DESCRIPTION OF THE DRAWINGS

FIG. 5 illustrates a side view of a portion of an output shaft of a parking brake system according to the teachings herein.

FIG. 6 illustrates a perspective view of an output gear of a parking brake system according to the teachings herein.

FIG. 7 illustrates a perspective view of a carrier of a parking brake system according to the teachings herein.

DETAILED DESCRIPTION

Figure 1:
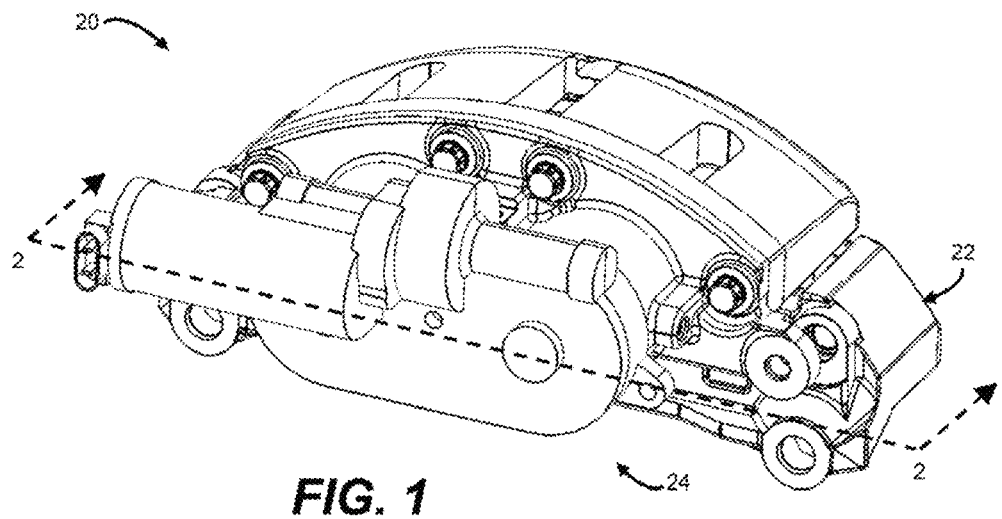
FIG. 1 illustrates a perspective view of a brake assembly according to the teachings herein.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally provide a parking brake assembly for use with any brake assembly. The present teachings generally provide a parking brake assembly for creating and releasing a brake apply. The parking brake assembly includes a differential and two output shafts. During rotation of at least one of the output shafts, a brake apply is either created or released. More specifically, during creation of the brake apply, the differential is unlocked and distributes a rotational unlocking force to each of the output shaft until one of the output shafts experiences higher resistance, which the differential then re-distributes the rotational unlocking force to the other output shaft with lower resistance. During release of the brake apply, the differential locks and equally distributes an opposing, rotational locking force to each of the output shafts.

The brake assembly may function to slow, stop, restrict, and/or prevent movement of a vehicle. The brake assembly may function to create a brake apply. The brake apply may be a braking force (i.e., any force) that slows, stops, restricts and/or prevents rotation of a rotor; slows, stops, restricts and/or prevents movement of a vehicle, or both. Additionally, or alternatively, the brake apply may be a parking brake force (i.e., any force), which, when a vehicle is in a stopped or parked position, may restrict or prevent rotation of a rotor; restrict or prevent movement of a vehicle, or both. The brake assembly may be any system or assembly that performs the aforementioned functions. For example, the brake assembly may be an opposing brake system (i.e., a fixed caliper brake system), a floating brake system (i.e., a floating caliper), a parking brake assembly, or a combination thereof. The brake assembly may be used with any vehicle to perform the aforementioned functions. For example, the brake assembly may be used with any light-duty passenger vehicle (e.g., a car, truck, sports utility vehicle, or the like), or any heavy-duty vehicle (e.g., a full size truck, van, sports utility vehicle, etc.). The brake assembly may include a parking brake assembly that may function to create a brake apply, a parking brake force, or both when the vehicle is in a stopped or parked position. To function, the parking brake assembly may use or incorporate any of the elements of the brake assembly.

The brake assembly may include a brake caliper that may function to house, contain, and/or provide for the attachment and function of any of the components of the brake assembly, the parking brake assembly, or both. For example, the brake caliper may function to provide for the movement of one or more brake pads, or, preferably, two or more brake pads relative to a rotor. The brake caliper may move during a brake apply (i.e., a floating caliper), or the brake caliper may be fixed so that the brake caliper does not move during a brake apply (i.e., a fixed caliper). The brake caliper may be connected to any support structure of any vehicle. Preferably, the brake caliper may be connected to a knuckle. The brake caliper may include one or more support brackets for engaging the one or more brake pads. Preferably, the one or more support brackets may be arranged around a rotor so that one or more brake pads are located on an inboard side of the rotor and one or more brake pads are located on an outboard side of the rotor.

The rotor may cooperate with one or more elements of the brake assembly to create and/or release a brake apply. The brake apply may be any force such as a braking force, a parking brake force, or both. The rotor may be generally circular and may extend through a brake caliper, may be partially surrounded by a brake caliper, or both. Preferably, the rotor extends at least partially between the brake caliper so that the friction material of one or more brake pads faces an inboard side of the rotor, and the friction material of one or more brake pads faces an outboard side of the rotor. During standard braking operations, the friction material of the one or more brake pads may be moved or pushed into contact with the or more sides of the rotor to create the brake apply (i.e., a braking force) so that the rotor, the vehicle, or both are slowed, stopped and/or restricted or are prevented from rotating or moving, respectively. During standard parking brake operations, the friction material of the one or more brake pads may be moved or pushed into contact with the one or more sides of the rotor to create the brake apply (i.e. a parking brake force) so that a stopped or parked vehicle or rotor is restricted or prevented from moving or rotating, respectively.

The one or more brake pads may cooperate with one or more elements of the brake assembly to create and/or release a brake apply. The brake apply may be any force such as a braking force, a parking brake force, or both. For example, a brake apply may be created when the friction material of the one or more brake pads is moved or pushed into contact with any surface, such as the one or more sides of the rotor. The one or more brake pads may include one or more features (i.e., ears, projections, etc.), which may engage the brake caliper, the support bracket, or both. The one or more brake pads may comprise any number of brake pads. For example, the one or more brake pads may comprise one or more first or inboard brake pad and/or one or more second or outboard brake pads. The one or more first or inboard brake pads may be configured to move towards and away from one side or face of a rotor (e.g., an inboard rotor face) and the one or more second or outboard brake pads may be configured to move towards and away from an opposing side or face of the rotor (e.g., an outboard rotor face). During creation of a brake apply (i.e., when the one or more brake pads are moved or pushed towards/against the rotor), the one or more brake pads may move in unison together, individually, sequentially, or a combination thereof. Another configuration envisioned includes a first end of one or more brake pads (i.e., a leading edge) moving towards the rotor in unison, together, individually, sequentially, or in a combination thereof with a second end of the one or more brake pads (i.e., a trailing edge). In a reverse movement (i.e., during release of the brake apply), it is envisioned that one or more brake pads, one or more ends of the one or more brake pads (i.e., a leading edge and a trailing edge), or both may move away from the rotor in unison, together, individually, sequentially, or in a combination thereof. Preferably, however, during release of the brake apply, the one or more ends of a brake pad (i.e., a leading edge and a trailing edge) move away from the rotor together generally in unison and generally at the same time. The one or more brake pads may include a friction material and a pressure plate. The friction material may include one or more non-metallic materials, semi-metallic materials, fully metallic materials, and ceramic materials. The pressure plate may be in selective communication or engagement with one or more piston assemblies.

The one or more piston assemblies may function to move the one or more brake pads towards and/or away from any surface to create or release a brake apply. The brake apply may be any force such as a braking force, a parking brake force, or both. The one or more piston assemblies may function to transfer or translate a rotational torque or force into a linear force to axially move the one or more brake pads relative to a rotor to create or release a brake apply. The one or more piston assemblies may include any components or features that may function to move the one or more brake pads towards or away from any surface to create or release the brake apply. The one or more piston assemblies may be in selective engagement with the pressure plate of one or more brake pads so that all or just an end of the one or more brake pads moves towards or away from a rotor. For example, while creating a brake apply in a configuration having multiple piston assemblies engaging one pressure plate, one piston assembly may be moved at a time so that either a first end contacts the rotor before the other end (i.e., sequential movement). In other configurations, each of the multiple piston assemblies can be moved at the same time so that both ends of the brake pad contacts the rotor at the same time. Preferably, while releasing a brake apply, in a configuration having multiple piston assemblies engaging one pressure plate, the multiple piston assemblies can be moved at the same time so that a first end and a second end of the brake pad can disengage from the rotor substantially simultaneously. The one or more piston assemblies may include a first piston assembly and a second piston assembly. The first piston assembly may be disposed near a first or leading end of a brake pad, and the second piston assembly may be disposed near a second or trailing end of a brake pad, or vice versa. Each of the one or more piston assemblies may include one or more pistons, one or more spindle nuts, and one or more spindles, which together may function to perform the previously recited functions.

The one or more pistons may function to move the one or more brake pads relative to any surface to create and/or release a brake apply. The brake apply may be any force, such as a braking force, a parking brake force, or both. The one or more pistons may move towards or away from a brake pad along a piston axis. The one or more pistons may move in and out of a corresponding piston opening or bore. The one or more pistons may seal a piston opening or bore in the brake caliper so that fluid is trapped within the piston opening or bore, the piston, or both. The one or more pistons may have sufficient strength so that the one or more pistons can be moved towards or away from the one or more brake pads via any fluid, via any mechanical device or linkage, such as a spindle nut and spindle, or a combination thereof. Preferably, during a standard brake apply, the one or more pistons are moved towards or away from the one or more brake pads via fluid pressure (i.e., brake fluid). Preferably, during a standard parking brake apply, the one or more pistons are moved towards or away from the one or more brake pads via a motor gear unit connected to a linkage including a spindle nut and a spindle. The one or more pistons may include a front end is may be generally flat for engaging and moving the one or more brake pads towards or away from the rotor, and a back end, which may include a pocket, for receiving fluid; for engaging a component of a mechanical linkage, such as a spindle nut; or a combination of both. The front end of the one or more pistons may be securely attached or coupled to the pressure plate of the brake pad, or the front end may removeably or selectively engage the pressure plate once the piston moves into contact with the pressure plate. The pocket may be keyed (e.g., threaded) and may engage a mating, keyed (e.g., threaded) spindle nut. However, it is envisioned that the pocket and the spindle nut may be engaged via any other type of engagement or attachment that may perform the aforementioned functions. The one or more pistons may be moved towards or away from the brake pad to create and/or release a brake apply, respectively, in unison, sequentially, or both. Preferably, the one or more pistons are moved away from a brake pad substantially together.

The one or more spindle nuts may function to engage the one or more pistons so that the one or brake pads can move relative to a rotor to create and/or release a brake apply (i.e. a parking brake force). The one or more spindle nuts may be any feature that functions to perform the aforementioned functions. The one or more spindle nuts may comprise a first nut engaging a first piston located near a first end of a brake pad (i.e., a leading end) and a second spindle nut engaging a second piston located near a second end of a brake pad (i.e., a trailing end). One spindle nut may engage a corresponding piston, or piston pocket, or both via any suitable engagement or attachment. For example, the engagement may be a threaded engagement, a sliding engagement, an interference engagement, a permanent engagement, a removable engagement, a keyed engagement, the like, or a combination thereof. The one or more spindle nuts may be at least partially received into the one or more piston pockets. A moving force (supplied from a motor gear unit, worm wheel, spindle, output shafts, etc.) may be applied to the one or more spindle nuts so that the one or more pistons move along a respective piston axis relative to a brake pad. The one or more spindle nuts may at least partially move relative to the pocket without the piston and/or the brake pad actually moving relative to the rotor (i.e., a gap may extend between a spindle nut and the piston pocket). The gap may be between 0 and 3 mm, between 0 and 2 mm, preferably between 0 and 1 mm, more preferably 0.5 mm. In other words, the spindle nut may be moved axially within the pocket a certain distance before the nut actually moves the piston and/or the brake pad. The one or more spindle nuts may be rotated within the pocket, translated along a piston axis within the pocket, or a combination thereof to move the piston, the brake pad, or both relative to the rotor. More specifically, the one or more spindle nuts may be rotated or translated in a first direction (i.e., in an unlocking direction) to move or advance the brake pad towards the rotor to create the brake apply. And, accordingly, the one or more spindle nuts may be rotated or translated in an opposing direction (i.e., in a locking direction) to move the brake pad away from the rotor to release the brake apply. In some configurations, it is envisioned that the one or more spindle nuts may be integrally formed with the one or more pistons, one or more spindles, or a combination thereof and function in the aforementioned manner.

The one or more spindles may function to engage the one or more pistons, spindle nuts, or both so that the one or brake pads can move relative to a rotor to create and/or release a brake apply (i.e. a parking brake force). The one or more spindles may be in communication with a respective worm wheel, output shaft, or both, and may cooperate with a respective spindle nut to translate a rotational force received from a motor gear unit, output shaft, worm wheel, differential, etc. into a linear force to move the pistons along respective piston axis. The one or more spindles may be any features that may perform the aforementioned functions. The one or more spindles may comprise a first spindle engaging a first spindle nut and piston located near a first end of a brake pad (i.e., a leading end) and a second spindle engaging a second spindle nut and piston located near a second end of a brake pad (i.e., a trailing end). The one or more spindles may engage the corresponding spindle nuts, via any suitable engagement or attachment for performing the aforementioned functions. Preferably, the engagement may be a threaded engagement. For this, each of the one or more spindles may include one or more threaded portions. The one or more spindles may be rotated or translated in a first direction (i.e., in an unlocking direction) to move the spindle nut, the piston, and/or the brake pad towards the rotor to create the brake apply. And, accordingly, the one or more spindles may be rotated or translated in an opposing direction (i.e., in a locking direction) to move the spindle nut, the piston, and/or the brake pad away from the rotor to release the brake apply. Again, it is within the scope of this disclosure that the one or more spindles, the one or more spindles nuts and/or the one or more pistons may be a single component and still function in the aforementioned manner.

One or more worm wheels may be in communication with a respective spindle. The one or more worm wheels may function to receive and transfer a rotational force or torque to the one or more spindles so that the one or more brake pads can move relative to the rotor. The rotational force may be a locking force, an unlocking force, or both supplied by or from a motor gear unit, a respective output shaft, a differential, etc. In other words, the one or more worm wheels may rotate in a first direction (i.e., in a unlocking direction) to move a corresponding spindle so that, ultimately, a corresponding brake pad moves towards the rotor to create the brake apply. And, accordingly, the one or more worm wheels may rotate in an opposing direction (i.e., in an locking direction) so that, ultimately, the corresponding brake pad moves away from the rotor to release the brake apply. Each worm wheel may include a flange or opening engaging a respective spindle. The engagement may be any suitable engagement for performing the aforementioned functions. Exemplary engagements may include, but are not limited to a threaded engagement, a sliding engagement, an interference engagement, a permanent engagement, a removable engagement, a keyed engagement, a magnetic engagement, the like, or a combination thereof. Each worm wheel may include features for engaging a respective output shaft, worm, motor gear unit, differential, or a combination thereof. Preferably, each worm wheel includes teeth for engaging any gear or shaft; however any suitable friction engagement may be used.

The one or more output shafts may function to provide or transfer a rotational force or torque to create and/or release a brake apply. More specifically, the one or more output shafts may function to receive a rotational force or torque (i.e., an unlocking force, a locking force, or both) generated or provided from a motor gear unit, a differential, or both and transfer said rotational force or torque to a respective piston assembly, worm wheel, or both. The one or more output shafts may include any suitable engagement for transferring said rotational force or torque to the respective piston assembly, worm wheel, or both. For example, the one or more output shafts may include one or more worms and/or teeth, which may engage a corresponding worm wheel. The one or more output shafts may include one or more bearings, counter weights, or both to assist in the rotation thereof (i.e., may create a low friction device). The one or more bearings may also function to connect and support each respective output gear to a brake caliper, or a housing or enclosure.

The one or more output shafts may include one or more hubs. The one or more hubs may include one or more hub projections for engaging corresponding output gears. The one or more hub projections may provide for the one or more output gears to move axially towards a corresponding carrier when the output gears are rotated in a locking direction so that a brake apply can be released. The one or more hub projections may provide for a corresponding output gear to move towards a corresponding carrier so that the output gear can engage the carrier and therefore lock the differential. In other words, the one or more hub features may create the force required for a corresponding output gear to move, engage, and remain engaged with the corresponding carrier so that the differential locks and stays locked during release of a brake apply. The one or more hub projections may be any feature that may function to perform the aforementioned functions. For example, the one or more hub projections may be one or more features engaging mating grooves on a corresponding output gear; one or more grooves engaging mating projections on a corresponding output gear; or a combination thereof. The one or more hub projections may have any shape for performing the aforementioned functions. Preferably, the hub projections are helically-shaped, however straight-shaped hub projections are also envisioned. The one or more hubs may also include one or more hub stoppers. When the one or more output gears move along a corresponding output shaft hub in an opposing direction (i.e., when the differential is rotated in an unlocking direction during creation of a brake apply), one or both of the output gears may move away from a respective carrier towards a respective hub stopper. The one or more output gears may engage a corresponding hub stopper, or may move into close proximity of a corresponding hub stopper during creation of a brake apply.

The one or more motor gear units (MGU) may be any device or combination of devices that may function to generate or provide a force or torque suitable for creating and/or releasing a brake apply (i.e., a rotational unlocking force and/or a rotational locking force, respectively). For example, the one or more motor gear units may include a DC motor, a series wound motor, a shunt wound motor, a compound wound motor, a separately exited motor, a servomotor, or a permanent magnet motor. The one or more motor gear units may include one or more gears that may function to transfer, increase, decrease, or a combination thereof any output force or torque generated by the motor. The one or more motor gear units may be located within a housing. The housing may be integrally formed with the brake caliper; removably attached to the brake caliper; or permanently attached to the brake caliper. The one or more motor gear units may directly or indirectly (i.e., via one or more linkages, piston assemblies, etc.) move the one or more pistons, brake pads, or both towards and/or away from the rotor to create and/or release the brake apply. The one or more motor gear units may generate a rotational force or torque, which is sufficient to move the one or more piston assemblies, brake pads, or both relative to the one or more brake pads to create and/or release a brake apply. The one or more motor gear units may generate a holding force sufficient to maintain one or more brake pads against a rotor. The rotational force or torque generated by the motor gear unit may be transferred to a reduction gear, a differential, one or more output shafts, piston assemblies, worm wheels, etc. to create, maintain, and/or release a brake apply.

The reduction gear may function to change or vary a rotational rate, speed, force, and/or torque generated by the motor gear unit. Preferably, the reduction gear causes an adjacent gear (i.e., an input gear) to rotate at a slower speed than an output of the motor. More preferably, the rotational force or torque generated by the motor can be increased by the reduction gear so that rotational force or torque transferred by the input gear is greater than the rotational force or torque output of the motor. The reduction gear may engage the motor, a motor gear, an input gear, or any other gear via any suitable engagement to perform the aforementioned functions. Preferably, the reduction gear frictionally engages adjacent gears via teeth. The reduction gear may have a reduction from the motor gear of about 1:20 or less, about 1:10 or less, or about 1:5 or less. The reduction gear may have a reduction from the motor gear of about 1:2 or more, about 1:3 or more, or about 1:4 or more. The reduction gear may directly and/or indirectly drive one or more differentials, carriers, output gears, worm wheels, piston assemblies, or a combination thereof via one or more gears.

The differential may function to provide a rotational force or torque (i.e., a rotational unlocking force) to one or both of the output shafts to create a brake apply, and may function to provide an opposing rotational force or torque (i.e., a rotational locking force) to both of the output shafts to release the brake apply. Stated another way, during creation of a brake apply, the differential may function to transfer the rotational unlocking force to the output shafts based on the resistance or torque realized by each output shaft. In this regard, the differential may limit or stop transferring a rotational unlocking force to an output shaft realizing a higher resistance or torque and instead divert some or all of that rotational unlocking force to the output shaft with a lower resistance. The differential may alternate and/or simultaneously transfer the rotational unlocking force to the output shafts until a sufficient brake apply is created. During release of the brake apply, the differential may function to transfer a rotational locking force simultaneously to the output shafts, regardless if one output shaft realizes a higher resistance or torque. In this regard, the one or more pistons and/or the one or more brake pads move away from the rotor at substantially the same time. The differential may be any device that performs the aforementioned functions. For example, the differential may be an epicyclic differential, a spur gear differential, a miter gear differential, or a combination thereof. The differential may generally include two opposing sides that may be the same or mirrored. Each side may be in communication with a corresponding piston assembly, which may be in communication with a corresponding side of a brake pad. Each side may include a corresponding output shaft, a carrier, one or more pinion gears, and an output gear. One of the carriers may be in communication with an input gear receiving rotational force or torque from the motor gear unit, the reduction gear, or a combination thereof.

The one or more carriers may include a plurality of openings or orifices for engaging shafts (i.e., pinion gear shafts) that extend between a first carrier and a second carrier. The shafts may engage the orifices to join the carrier together. The engagement may be any suitable engagement, such as a threaded engagement, a press-fit engagement, a locking engagement, etc. Each pinon gear shaft may include a pinion gear in an alternating fashion so that half of the pinion gears contact a first output gear and half of the pinion gears contact a second output gear. Stated another way, the pinion gears can contact corresponding output gears and adjacent pinion gears associated with another output gear so that the differential can rotate both output gears together when the differential is locked (i.e., release of a brake apply), or each side of the differential can rotate independently of the other when the differential is unlocked (i.e., creation of a brake apply). The one or more carriers may include one or more bosses, which may function to provide a stand off to keep the carriers in a spaced relation. Additionally, or alternatively, one or more bores in the one or more bosses may receive or provide for one or more fasteners to couple the carriers together. The one or more carriers may include one or more notches, recesses, detents, teeth, helical teeth, magnets, etc. or other suitable engaging features for engaging the one or more output gears when the differential is rotated in a locking direction (i.e., release of a brake apply). Preferably, each of the one or more carriers includes one or more notches receiving one or more detents on the corresponding output gear to lock the differential when the differential is rotated in the locking direction.

The one or more output gears may function to transfer or transmit rotational force or torque to a corresponding output shaft. The one or more output gears may be driven by corresponding pinion gears or by one or both of the carriers. The one or more output gears may include teeth for engaging mating teeth on the one or more pinion gears. The one or more output gears may include one or more notches, recesses, detents, teeth, helical teeth, magnets, etc. or other suitable engaging features for engaging the one or more output gears when the differential is rotated in a locking direction to lock the differential and release a brake apply. Preferably, each of the one or more output gears include one or more detents for engaging one or more notches on the corresponding carrier gear to lock the differential when the differential is rotated in the locking direction to release the brake apply. The one or more output gears may include one or more features allowing the one or more output gears to move on a corresponding output shaft or hub when the one or more output gears are rotated in a locking direction. The one or more features may be one or more grooves, one or more projections, or a combination thereof. The corresponding output shaft may include corresponding features for the corresponding output gear to move on. That is, the corresponding features may include one or more hub projections, which may be one or more projections engaging mating grooves, one or more grooves engaging mating projections, or a combination thereof. Preferably, each output gear includes a plurality of grooves engaging a plurality of projections on the hub of each output shaft. The one or more output gears may include two output gears that are the same or mirror copies of one another.

Creation of a brake apply may begin by rotating the input gear (via the motor gear unit) in an unlocking direction, which causes the first carrier to rotate in the first or rotational unlocking direction. Assuming equal resistance on each of the output shafts, rotation of the input gear in the unlocking direction causes the first carrier to rotate the corresponding first pinion gears in the unlocking direction. The first pinion gears can rotate about their respective pinion gear shafts and can also rotate the corresponding first output gear so that the first output shaft in communication with the first output gear also rotates. The first pinion gears can also rotate adjacent second pinion gears associated with the other, second side of the differential. Rotation of the second pinon gears in the unlocking direction causes the corresponding second output gear to rotate, which in turn rotates the corresponding second output shaft in the unlocking direction so that the corresponding piston assemblies and/or the brake pads can move towards the rotor to create a brake apply.

If/when one of the output shafts realize an increase in resistance, the differential may function to limit or stop transferring the rotational unlocking force to that output shaft and may instead divert some or all of that rotational unlocking force to the output shaft realizing lower resistance. In this regard, the pinion gears associated with the output shaft realizing the higher resistance may be restricted from rotating the corresponding output gear (i.e., the pinion gears may not be able to overcome the increase in resistance realized on that output shaft/output gear), and may instead only rotate about their corresponding pinion gear shafts. Rotation of the pinion gears about their corresponding pinion gear shaft can still rotate the adjacent pinion gears on the opposing side realizing the lower resistance, which causes the corresponding output gear to rotate that corresponding output shaft so that the corresponding piston assembly realizing the lower resistance can move towards the rotor to create a brake apply. An increase in resistance may be realized if/when, for example, a corresponding piston engages the brake pad before the other piston engages the brake pad, and/or or if a corresponding end of a brake pad engages the rotor before the other end engages the rotor.

Release of the brake apply may begin by rotating the input gear in a second or rotational locking direction. Rotation of the input gear in the second or rotational locking direction causes the first carrier and the first pinion gears to rotate in the locking direction. The first pinion gears may include helical teeth so that rotation of the first pinion gears in the locking direction causes the corresponding first output gear to move along straight-shaped hub projections until the first output gear engages the first carrier and both rotate together (i.e., the differential is locked). Alternatively, the first pinion gears may have straight-shaped teeth, and rotation of the first pinion gears in the locking direction causes helically-shaped hub projections to move the first output gear towards the first carrier so that the first output gear can engage the first carrier and both rotate together (i.e., the differential is locked). The first output gear may engage the first carrier via any suitable engagement. For example, the engagement been the respective carrier and output gear may include detents engaging notches, any friction engagement, magnetic engagement, the like, or a combination thereof. Once locked, therefore, rotation of the first output gear causes the second output gear to also rotate, so that the first and second output shafts rotate together, regardless if one of the output shafts realizes a higher resistance. While the above description includes the first output gear engaging/disengaging the first carrier to lock/unlock the differential, it is understood that additionally, or alternatively, the second output gear can engage/disengage the second carrier in a similar manner to lock/unlock the differential.

FIG. 1 illustrates a perspective view of a brake assembly 20. The brake assembly 20 generally includes a brake caliper 22 and a motor gear unit 24.

Figure 2:
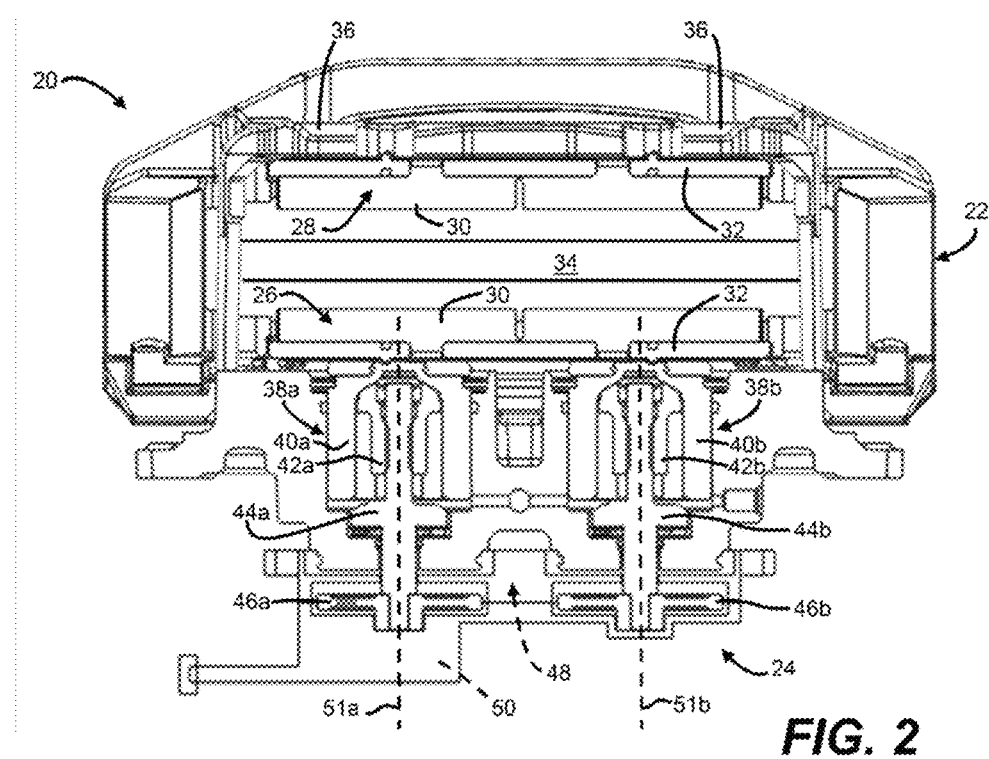
FIG. 2 illustrates a cross-sectional view of the brake assembly of FIG. 1 taken along line 2-2 according to the teachings herein.

FIG. 2 illustrates a cross-sectional view of the brake assembly 20 of FIG. 1 taken along line 2-2. The brake caliper 22 includes an inner brake pad 26 and an outer brake pad 28. Each brake pad 26, 28 includes a friction material 30 and a pressure plate 32. The brake pads 26, 28 are arranged in the brake caliper 22 so that the friction material 30 of each brake pad 26, 28 faces a side of the brake rotor 34. The brake caliper 22 also includes fingers 36 that, during a brake apply, contact the outer brake pad 28 and pull the outer brake pad 28 towards the brake rotor 34. The brake caliper 22 further includes a first piston assembly 38a located near a first or leading end of the inboard brake pad 26 and a second piston assembly 38b located near a second or trailing end of the inboard brake pad 26. The motor gear unit 24 includes worm wheels 46a, 46b, a differential 48 and a motor 50. The first piston assembly 38a includes a first piston 40a moveably supported in a first piston bore, a first spindle nut 42a in communication with the first piston 40a, a first spindle 44a in communication with the first spindle nut 42a, and a first spindle 44a in communication with the worm wheel 46a. Similarly, the second piston assembly 38b includes a second piston 40b moveably supported in a second piston bore, a second spindle nut 42b in communication with the second piston 40b, a second spindle 44b in communication with the second spindle nut 42b, and a second spindle 44b in communication with the second worm wheel.

The brake caliper 22 of the present teachings may be a floating brake caliper; however, any type of brake caliper and/or brake system is within the scope of this disclosure. The brake caliper 22 may be used to create a brake apply during a standard braking operation, during a standard parking brake operation, or both. During a standard braking operation, brake fluid may be supplied to the brake caliper 22 (or moved therein) so that one or both of the pistons 40a, 40b move along a respective piston axis 51a, 51b towards the inner brake pad 26. One or both of the pistons 40a. 40b may contact the inner brake pad 26 and move the inner brake pad 26 towards the brake rotor 34. As the inner brake pad 26 is moved towards one side of the brake rotor 34, the fingers 36 may move the outer brake pad 28 towards the other side of the brake rotor 34 until the friction material 30 of one or both of the brake pads 26, 28 contacts the brake rotor 34 to create the brake apply. Withdrawal or subsequent movement of the brake fluid may cause the friction material 30 of both brake pads 26, 28 to no longer contact the brake rotor 34. Accordingly, the brake apply is released.

During a standard parking brake operation, the brake apply may be created to maintain the vehicle in a stopped or parked position. To create the brake apply, the motor 50 may rotate the differential 48 in a first, unlocking direction, causing one or both of the worm wheels 46a, 46b to rotate in an unlocking direction. Rotation of one or both of the worm wheels 46a, 46b in an unlocking direction causes a corresponding one or both of the spindles 42a, 42b to rotate a corresponding spindle nut 42a, 42b in an unlocking direction. Rotation of a respective spindle nut 42a, 42b in an unlocking direction causes a corresponding piston 40a, 40b to move the inner brake pad 26 towards the brake rotor 34. Movement of the inner brake pad 26 towards the brake rotor 34 causes the outer brake pad 28 to also move towards the brake rotor 34 (via the fingers 36) until the friction material 30 of one or both brake pads 26, 28 contacts the brake rotor 34 to create the brake apply. To release the brake apply, the motor 50 may rotate the differential 48 in an opposing, second, locking direction, causing both worm wheels 46a, 46b to rotate in a locking direction, which causes the corresponding spindles 42a, 42b to rotate both corresponding spindle nuts 42a. 42b in a locking direction. Rotation of the spindle nuts 42a, 42b in the locking direction causes the corresponding pistons 40a. 40b and the inner brake pad 26 to move away from the brake rotor 34 so that the brake pads 26, 28 are no longer in contact the brake rotor 34. Accordingly, the brake apply is released.

Figure 3:
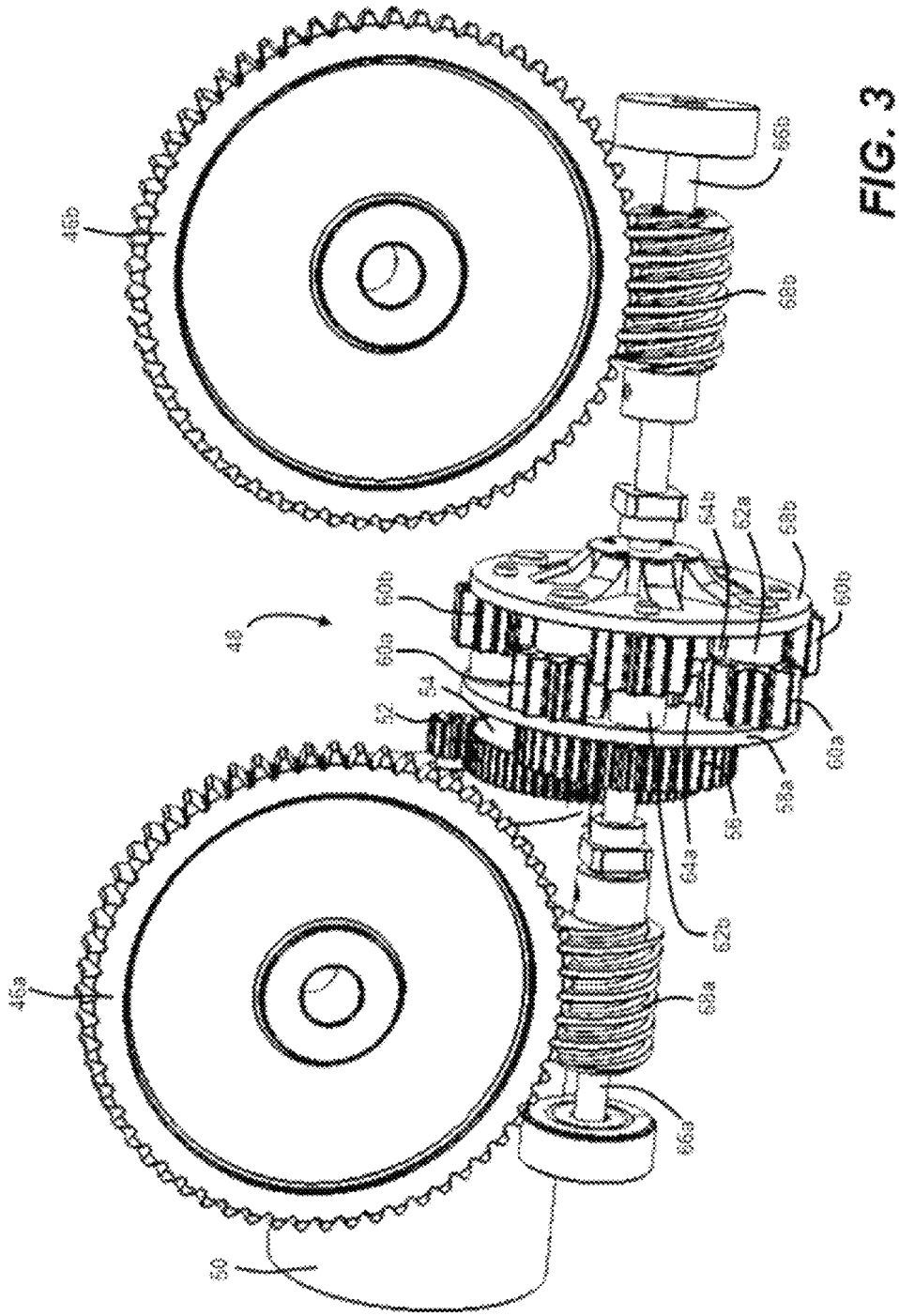
FIG. 3 illustrates a perspective view of a portion of a parking brake system of a brake assembly according to the teachings herein.

FIG. 3 illustrates the differential 48. To create the brake apply, the motor 50, via a motor gear 52, rotates a reduction gear 54 in a first, unlocking direction, which correspondingly rotates an input gear 56 in an unlocking direction. Rotation of the input gear 56 in an unlocking direction can rotate a first carrier 58a, one or more first pinion gears 60a, or both in an unlocking direction. The first pinion gears 60a can rotate the second pinion gears 60b in an unlocking direction, which can rotate a second carrier 58b in an unlocking direction. First and second output shafts 66a. 66b are independently rotated in an unlocking direction by corresponding first and second output gears 64a, 64b, which are in selective communication with corresponding first and second pinion gears 60a, 60b. That is, depending on the amount of resistance or torque realized on a corresponding output shaft 66a, 66b, one or both of the output gear 64a, 64b can be rotated by corresponding pinion gears 60a, 60b. Each output shaft 66a. 66b includes a corresponding worm 68a, 68b in communication with a corresponding worm wheel 46a, 46b.

While creating the brake apply, if/when a higher resistance or torque is realized on one of the output shafts 66a, 66b, the differential 48 will at least partially disengage and cease or restrict rotating that corresponding output gear 64a, 64b in an unlocking direction. The differential 48 will instead re-distribute at least a portion of that rotational force to the other output gear 64a, 64b realizing a lower resistance or torque. The corresponding pinion gears 60a, 60b associated with the output shaft 66a, 66b realizing the higher resistance or torque will rotate about their respective pinion gear shafts 62a, 62b rather than rotating the corresponding output gear 64a, 64b.

To release the brake apply, each of output gears 64a, 64b are rotated in a second, locking direction. As the output gears begin 64a, 64b rotate in the locking direction, one or both of the output gears 64a, 64b move along the corresponding output shaft 66a. 66b until the detents 74a, 74b (FIGS. 4 and 6) of at least one of the output gears 64a, 64b engage notches 84a, 84b (FIG. 7) of a corresponding carrier 58a, 58b. Once one or both of the output gears 64a, 64b are engaged, both output shafts 66a, 66b are in a locked position 88 (FIG. 8b) so that the output shafts 66a, 66b can rotate together, regardless if a higher resistance or torque is realized on one of the output shafts 66a, 66b. In other words, in the locked position 88, the differential 48 will equally distribute rotational force to both output shafts 66a, 66b. In the locked position 88, rotation of both output shafts 66a, 66b in the locking direction causes the corresponding worms 68a, 68b to rotate the corresponding worm wheels 46a, 46b in the locking direction. Accordingly, the pistons 40a, 40b are moved at substantially the same time so that the inner and outer brake pads 26, 28 can disengage the brake rotor 34 and release the brake apply. Engaging the notches 84a, 984b of at least one of the carriers 58a, 58b also prevents rotation of one or both of the output shafts 66a. 66b in an opposing direction (e.g., in an unlocking direction).

Figure 4:
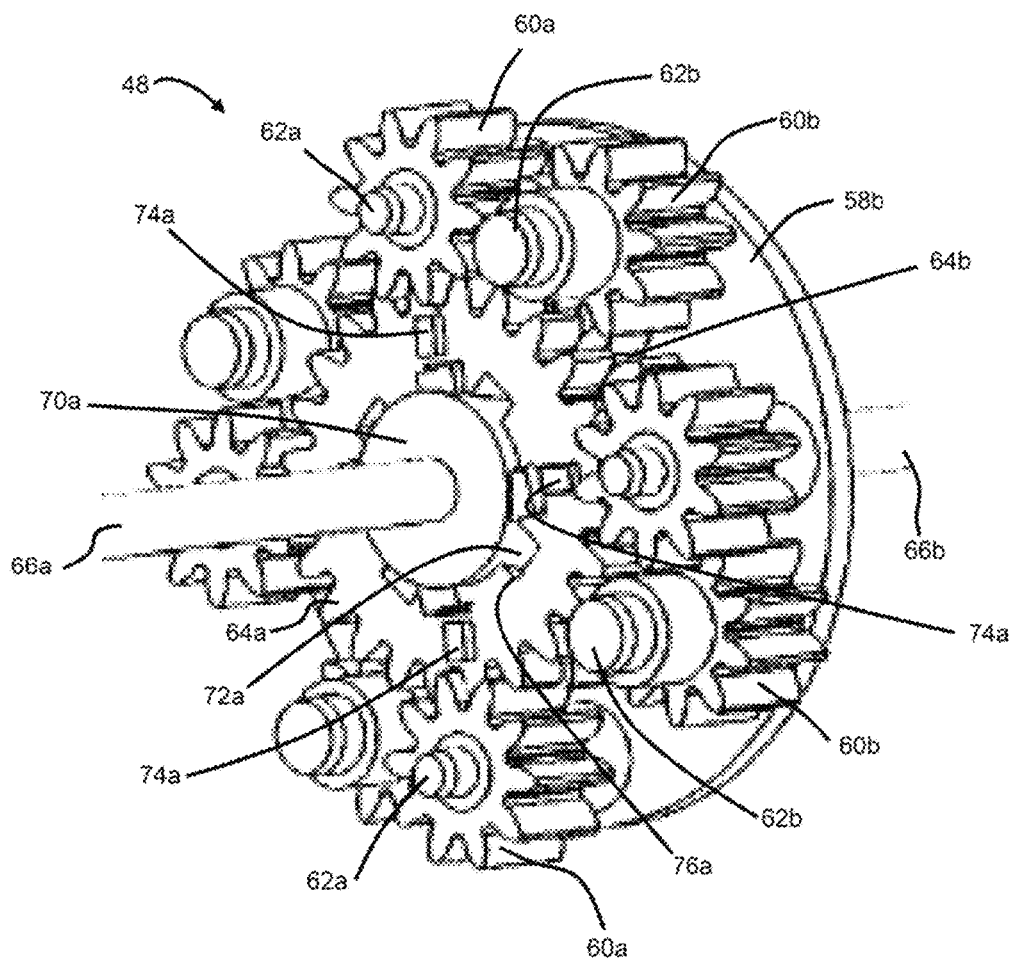
FIG. 4 illustrates a perspective view of a portion of a parking brake system according to the teachings herein.

FIG. 4 further illustrates a portion of the differential 48. In FIG. 4, the first carrier 58a is removed for clarity. The first pinion gears 60a can rotate about corresponding first pinion gear shafts 62a; can rotate the first output gear 64a; can rotate an adjacent second pinion gear 60b, or a combination thereof. The second pinion gears 60b can rotate about corresponding second pinion gear shafts 62b; can rotate the second output gear 64b; can rotate an adjacent first pinion gear 60a, or a combination thereof. The first and second pinion gear shafts 62a, 62b can also engage apertures 82a, 82b (FIG. 7) in a corresponding carrier 58a, 58b to secure the carriers 58a, 58b together.

Each output shaft 66a, 66b includes a hub 70a (70b is not shown; See FIG. 5) including hub projections 72a (72b is not shown; See FIG. 5). Each output gear 64a, 64b includes output gear grooves 76a (76b is not shown; See FIG. 5) moveably engaging corresponding hub projections 72a, 72b. Each output gear 64a, 64b also includes detents 74a (74b is not shown; See FIG. 6) engaging corresponding notches 84a, 84b (FIG. 7) during creation of the brake apply and while maintaining the brake apply (i.e., when the differential 48 is in the locked position 88).

Figure 10:
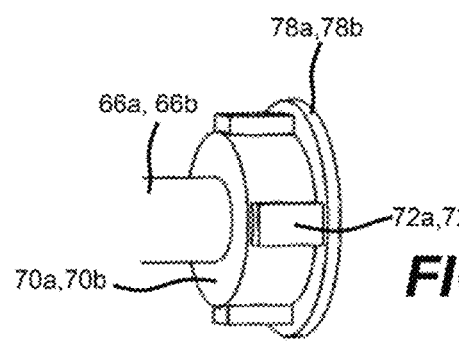
FIG. 10 illustrates a perspective view of a portion of an output shaft of a parking brake system according to the teachings herein.

FIG. 5 illustrates the output shaft 66a, 66b. Each output shaft 66a, 66b may be the same, or a mirror copy of the other. The output shaft 66a, 66b includes a hub 70a, 70b with hub projections 72a, 72b and a hub stopper 78a, 78b. The hub projections 72a, 72b are generally helically-shaped. The hub projections 72a, 72b can also be generally straight-shaped (FIG. 10).

FIG. 6 illustrates the output gear 64a. 64b. Each output gear 64a. 64b may be the same, or a mirror copy of the other. Each output gear 64a, 64b includes corresponding output gear grooves 76a 76b moveably engaging corresponding hub projections 72a, 72b (FIG. 5). That is, each output gear groove 76a, 76b is sized and shaped so that each output gear 64a, 64b can move or slide on the corresponding hub projections 72a, 72b so that the differential 48 can move between an unlocked position 86 and a locked position 88. More specifically, during creation of the brake apply, the output gears 64a, 64b move along the hub projections 72a, 72b towards a corresponding hub stopper 78a, 78b so that the detents 74a, 74b can disengage the notches 84a, 84b of a corresponding carrier 58a, 58b (i.e., the differential 48 is in an unlocked position 86). During release of a brake apply, the output gears 64a, 64b move along the hub projections 72a, 72b towards a corresponding carrier 58a, 58b so that the detents 74a, 74b can engage the notches 84a, 84b of a corresponding carrier 58a, 58b (i.e., the differential 48 is in an locked position 88).

FIG. 7 illustrates the carrier 58a, 58b. Each carrier 58a, 58b may be the same, or a mirror copy of the other. The carrier 58a, 58b includes bosses 80a. 80b, notches 84a, 84b, and orifices 82a, 82b. The bosses 80a, 80b can provide a standoff between the carriers 58a, 58b; can provide for attaching the first and second carriers 58a, 58b together (e.g., by driving a fastener into the one or more bosses 58a, 58b, for example; or both. During creation of the brake apply, the output gears 64a, 64b are moved away from the carriers 58a, 58b so that the detents 74a, 74b do not engage the corresponding notches 84a, 84b (i.e., the differential 48 is in an unlocked position 86). During release of the brake apply, at least one of the output gears 64a, 64b moves toward a corresponding carrier 58a, 58b so that the corresponding detents 74a, 74b engage the notches 84a, 84b thereby locking the differential 48 (i.e., the differential 48 is in an locked position 88). The orifices 82*a*, 82*b* can engage corresponding pinion gear shafts 62*a*, 62*b*, which can function to couple the carriers 58*a*, 58*b* together.

Figure 8A:
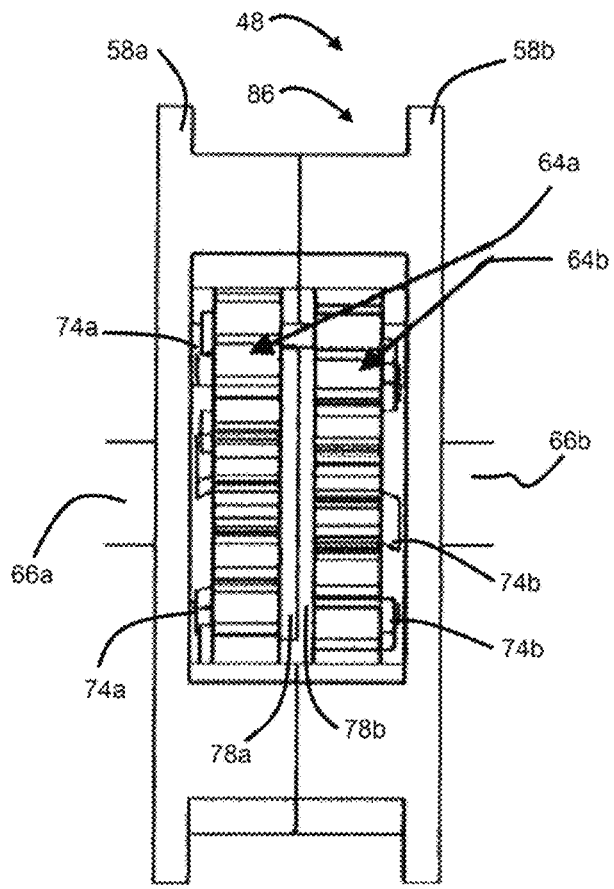
FIG. 8a illustrates a side view of a portion of a differential of a parking brake system according to the teachings herein.

FIG. 8*a* illustrates the differential 48 in the unlocked position 86. For clarity, the pinion gears 60*a*, 60*b* and corresponding pinion gear shafts 62*a*, 62*b* are not shown. In the unlocked position 86, a brake apply can be created or is created. That is, in the unlocked position 86, the output gears 64*a*, 64*b* are moved towards, or are positioned near or against the corresponding hub stoppers 78*a*, 78*b*, and the detents 74*a*, 74*b* are not in engagement with the notches 84*a*, 84*b* (not shown) of the corresponding carriers 58*a*, 58*b*. Accordingly, in the unlocked position 86, the differential 48 can re-distribute rotational force to the output shaft 66*a*, 66*b* or worm wheel 46*a*, 46*b* realizing the lower amount of resistance or torque.

Figure 8B:
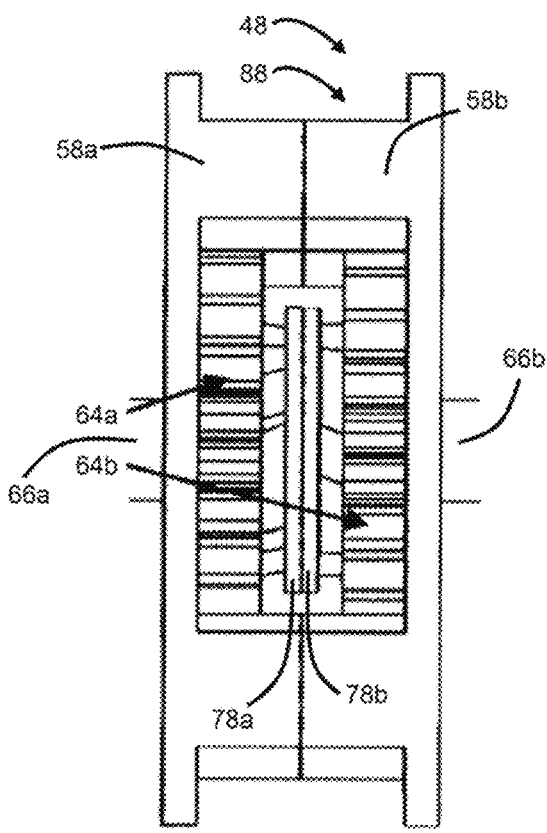
FIG. 8b illustrates a side view of a portion of a differential of a parking brake system according to the teachings herein.

FIG. 8*b* illustrates the differential 48 in the locked position 88. In the locked position 88, the differential 48 functions to release the brake apply. In the locked position 88, the corresponding detents 74*a*, 74*b* (not shown) of at least one of the output gears 64*a*, 64*b* engage corresponding notches 84*a*, 84*b* of at least one of the corresponding carriers 58*a*, 58*b*. Accordingly, in the locked position 88, the differential 48 can distribute rotational force equally to each output shaft 66*a*, 66*b* to release the brake apply.

Figure 9:
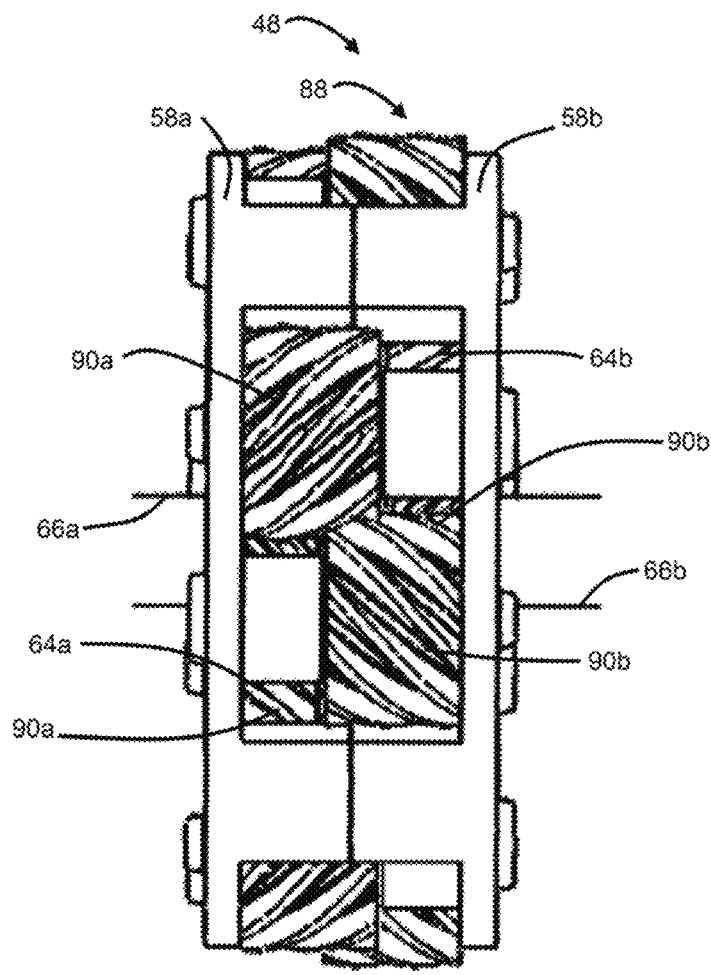
FIG. 9 illustrates a side view of a portion of a differential of a parking brake system according to the teachings herein.

FIG. 9 illustrates the differential 48 in the locked position 88. One or both of the output gears 64*a*, 64*b* may include helical teeth 90*a*, 90*b*, which are driven by corresponding pinion gears 60*a*, 60*b* (not shown) having corresponding helical teeth. In this regard, rotation of one or both of the pinion gears 60*a*, 60*b* in the locking direction causes one or both of the output gears 58*a*, 58*b* to move towards a corresponding carrier 58*a*. 58*b* so that detents 74*a*, 74*b* (not shown) can engage corresponding notches 84*a*, 84*b* of at least one of the corresponding carriers 58*a*, 58*b*. Rotation of one or both of the pinion gears 60*a*, 60*b* in the opposing unlocking direction causes one or both of the pinion gears 60*a*, 60*b* to move the output gears 64*a*, 64*b* away from a respective carrier 58*a*, 58*b* thereby unlocking the differential 48.

FIG. 10 illustrates the output shaft 66*a*, 66*b*. Each output shaft 66*a*, 66*b* may be the same, or a mirror copy of the other. The output shaft 60*a*, 60*b* includes a hub 70*a*, 70*b* with hub projections 72*a*, 72*b* and a hub stopper 78*a*, 78*b*. The hub projections 72*a*, 72*b* are generally straight-shaped. The straight-shaped hub projections 72*a*, 72*b* may be better suited for use with output gears 64*a*. 64*b* of FIG. 9 vs. the output gears 64*a*, 64*b* FIG. 6.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The omission in the following claims of any aspect of subject matter that is disclosed herein is not a disclaimer of such subject matter, nor should it be regarded that the inventors did not consider such subject matter to be part of the disclosed inventive subject matter.

LISTING OF REFERENCE NUMERALS 20. brake assembly
22. brake caliper
24. motor gear unit
26. inner brake pad
28. outer brake pad
30. friction material
32. pressure plate
34. brake rotor
36. fingers
38*a*. first piston assembly
38*b*. second piston assembly
40*a*. first piston
40*b*. second piston
42*a*. first spindle nut
42*b*. second spindle nut
44*a*. first spindle
44*b*. second spindle
46*a*. first worm wheel
46*b*. second worm wheel
48. differential
50. motor
51*a*. axis
51*b*. axis
52. motor gear
54. reduction gear
56. input gear
58*a*. first carrier
58*b*. second carrier
60*a*. first pinion gear
60*b*. second pinion gear
62*a*. first pinion gear shaft
62*b*. second pinion gear shaft
64*a*. first output gear
64*b*. second output gear of
66*a*. first output shaft
66*b*. second output shaft
68*a*. first worm 68b. second worm
70a. first hub
70b. second hub
72a. first hub projections
72b. second hub projections
74a. first detents
74b. second detents
76a. first output gear grooves
76b. second output gear grooves
78a. first hub stopper
78b. second hub stopper
80a. first boss
80b. second boss
82a. first orifice
82b. second orifice
84a. first notches
84b. second notches
86. unlocked, open position
88. locked, closed position
90a. first helical teeth
90b. second helical teeth

I claim:

1. A brake assembly comprising:
i. a differential; and
ii. a pair of output shafts,
wherein during rotation of at least one of the output shafts a brake apply is created or released,
wherein during creation of the brake apply, the differential is unlocked and distributes a rotational force to both of the output shafts until one of the output shafts experiences a higher resistance than the other of the output shafts and then the differential re-distributes the rotational force to the other of the output shafts with lower resistance, and
wherein during release of the brake apply, the differential is locked so that an opposing rotational force is distributed equally to both of the output shafts.

2. The brake assembly of claim 1, wherein the differential includes one or more carriers and one or more output gears selectively engaging the one or more carriers,
wherein during the release of the brake apply, at least one of the one or more output gears engage at least one of the one or more carriers to lock the differential so that the opposing rotational force is distributed equally to both of the output shafts regardless if one of the output shafts realizes higher resistance than the other of the output shafts.

3. The brake assembly of claim 2, wherein at least one of the one or more output gears include detents and at least one of the one or more carriers include notches,
wherein during the release of the brake apply, the detents of at least one of the one or more output gears engage the notches of a corresponding one of the one or more carriers so that the differential locks and the opposing rotational force is distributed equally to each of the output shafts.

4. The brake assembly of claim 2, wherein each of the output shafts include a hub with one or more hub projections, and each of the one or more output gears includes one or more grooves engaging the hub projections,
wherein,
i. during the creation of the brake apply, the hub projections move the one or more output gears away from the one or more carriers so that the one or more output gears are free of engagement with the one or more carriers, and
ii. during the release of the brake apply, the hub projections cause the one or more output gears to move towards a corresponding one of the one or more carriers until one or more of the output gears engage the one or more carriers.

5. The brake assembly of claim 4, wherein the hub of each of the output shafts includes a stopper,
wherein during creation of the brake apply, the one or more hub projections cause the one or more output gears to move away from the one or more carriers until the one or more output gears are near or contact a corresponding stopper.

6. The brake assembly of claim 2, wherein the differential includes two carriers that are in communication with each other via one or more pinion gear shafts.

7. The brake assembly of claim 1, wherein each of the output shafts are in communication with a piston, and each of the pistons are moveable along a piston axis so that during the creation of the brake apply, at least one of the pistons push a brake pad against a rotor to create the brake apply.

8. The brake assembly of claim 1, wherein each of the output shafts are in communication with a corresponding worm wheel, and each of the worm wheels are in communication with a corresponding spindle, and each of the spindles are in communication with a corresponding spindle nut, and each of the spindle nuts are in communication with a corresponding piston,
wherein the corresponding worm wheels, spindles, and spindle nuts cooperate to transfer the rotational force or the opposing rotational force from a corresponding one of the output shafts into a linear force to move the corresponding piston along a piston axis.

9. The brake assembly of claim 4, wherein the one or more hub projections are helically-shaped.

10. The brake assembly of claim 8, wherein each of the output shafts include a worm, and each of the worms are in communication with a corresponding one of the worm wheels.

11. The brake assembly of claim 2, wherein the one or more output gears include helical teeth engaging helical teeth of one or more pinion gears,
wherein,
i. during the creation of the brake apply, the one or more pinion gears cause the one or more output gears to move away from the one or more carriers so that the one or more output gears are free of engagement with the one or more carriers, and
ii. during the release of the brake apply, the one or more pinion gears cause the one or more output gears to move towards a corresponding carrier until one or more of the output gears engage the one or more carriers.

12. The brake assembly of claim 11, wherein each of the output shafts include a hub with one or more hub projections that are straight-shaped,
wherein during the creation of the brake apply, the one or more output gears are moved along the straight-shaped hub projections away from a corresponding one of the carriers, and during the release of the brake apply, the one or more output gears move along the straight shaped-hub projections towards a corresponding one of the carriers.

13. The brake assembly of claim 3, wherein at least one of the one or more output gears includes four detents, and at least one of the one or more carriers include four corresponding notches.

14. The brake assembly of claim 4, wherein the one or more grooves are helically-shaped so that during creation or release of the brake apply, the one or more output gears can move along the helically shaped hub projections.

15. The brake assembly of claim 6, wherein the differential includes one or more pinion gears that rotate about the corresponding pinion gear shafts.

16. A brake assembly comprising;
   a. a parking brake assembly comprising:
      i. a differential including:
         1. a pair of opposing carriers each of which include one or more notches; and
         2. a pair of moveable output gears in selective engagement with the pair of carriers, each of the moveable output gears include one or more detents;
      ii. a pair of output shafts in communication with the differential,
   wherein during the creation of a brake apply, a motor supplies a rotational unlocking force to the differential and during release of the brake apply, the motor supplies a rotational locking force to the differential,
   wherein during creation of the brake apply, the differential distributes the rotational unlocking force to each of the pair of output shafts until one of the pair of output shafts experiences higher resistance and then the differential re-distributes the rotational unlocking force to the other of the pair of output shafts with lower resistance, and
   wherein during the release of the brake apply, the one or more detents of at least one of the pair of output gears engage the one or more notches of at least one of the pair of carriers so that the differential distributes the rotational locking force equally to each of the output shafts.

17. The brake assembly of claim 16, wherein each of the pair of output shafts include a hub with one or more hub projections, and each of the pair of output gears includes one or more grooves slidably engaging the one or more hub projections,
   wherein during the creation of the brake apply, each of the pair of output gears are moved along the one or more hub projections away from as corresponding one of the pair of carriers so that each of the pair of output gears are free of engagement with the pair of carriers, and
   wherein during the release of the brake apply, one or both of the pair of output gears are moved along the one or more hub projections towards a corresponding one or both of the pair of opposing carriers until one or both of the pair of output gears engage a corresponding one or both carriers of the pair of carriers.

18. The brake assembly of any of claim 16, wherein the brake assembly includes one or more brake pads in communication with one or more piston assemblies, the one or more piston assemblies each include at least one moveable piston in communication with at least one worm wheel,
   wherein each of the pair of output shafts are in communication with one of the one or more piston assemblies, and each of the one or more pistons are moveable along a piston axis so that during the creation of the brake apply, at least one of the one or more pistons push the at least one brake pad against a rotor to create the brake apply.

19. The brake assembly of claim 18, wherein the at least one worm wheel is in communication with one or more spindles, and the one or more spindles are in communication with one or more spindle nuts, and the one or more spindle nuts are in communication with the one or more pistons,
   wherein the one or more worm wheels, spindles, and spindle nuts cooperate to transfer the rotational unlocking force, the rotational locking force, or supplied by at least one of the pair output shafts into a linear force to move the one or more pistons along the piston axis.

20. The brake assembly of claim 16, wherein the one or more output gears include helical teeth engaging helical teeth of one or more pinion gears,
   wherein,
      i. during the creation of the brake apply, the one or more pinion gears cause the one or more output gears to move away from the one or more carriers so that the one or more output gears are free of engagement with the one or more carriers, and
      ii. during the release of the brake apply, the one or more pinion gears cause the one or more output gears to move towards a corresponding carrier until one or more of the output gears engage the one or more carriers.

* * * * *